United States Patent

[11] 3,603,700

[72] Inventor Michael Eskeli
  2932 Sandage Ave., Fort Worth, Tex. 76109
[21] Appl. No. 827,482
[22] Filed May 19, 1969
[45] Patented Sept. 7, 1971

[54] ROTATING CIRCULAR WING
  6 Claims, 4 Drawing Figs.
[52] U.S. Cl. .................................................. 416/180,
  416/175, 416/203, 416/211
[51] Int. Cl. ....................................................... B64c 27/10
[50] Field of Search ........................................... 416/179,
  180, 203, 185–188, 202, 210, 211, 175

[56] References Cited
UNITED STATES PATENTS
1,971,820 8/1934 Jackson ........................ 416/218 (X)
2,569,273 9/1951 Alexandre .................... 416/210 (X)
3,504,990 4/1970 Sugden ......................... 416/211 (X)

FOREIGN PATENTS
596,718 4/1960 Canada ......................... 416/189
543,399 6/1922 France .......................... 416/196
626,660 5/1927 France .......................... 416/175
114,919         Great Britain ................ 416/210
286,849 3/1953 Switzerland .................. 416/175

Primary Examiner—Everette A. Powell, Jr.
Attorney—Wofford, Felsman & Fails

ABSTRACT: A propulsion device for vertical takeoff and landing type aircraft consisting of one or more rotary circular wings; the wings being of circular shape but having standard airfoil cross sections with vanes on the surfaces to cause air to pass radially outwardly over the airfoil surfaces. Lift is produced by air passage over the airfoil surfaces in a manner similar to standard aircraft wings, but high velocity air flow and high lift is feasible regardless of the speed of the aircraft.

INVENTOR.
Michael Erskel
BY

3,603,700

ROTATING CIRCULAR WING

BACKGROUND OF THE INVENTION

This invention relates generally to propulsion systems for aircraft. More particularly this invention relates to a circular rotating wing device for vertical takeoff and landing type aircraft.

Heretofore, and up to the present time several devices have been evolved for this purpose. The nearest approach to the means that I employ utilizes a rotating airfoil where two or more airfoil blades are mounted radially on a vertical shaft, and rotated, as in a helicopter.

Several disadvantages are inherent in these systems, the main one being that it is difficult to construct a machine to carry heavy loads due to shape and configuration of the rotating blades.

An object of the present invention is to obtain a propulsion system that can be used to lift heavy loads either vertically or in any other direction.

Other and further features and objects of the invention will be more apparent to those skilled in the art upon a consideration of the appended drawing and the following description wherein a constructional form of apparatus for carrying out the invention are disclosed.

DESCRIPTION OF PREFERRED EMBODIMENTS

Figure 1:
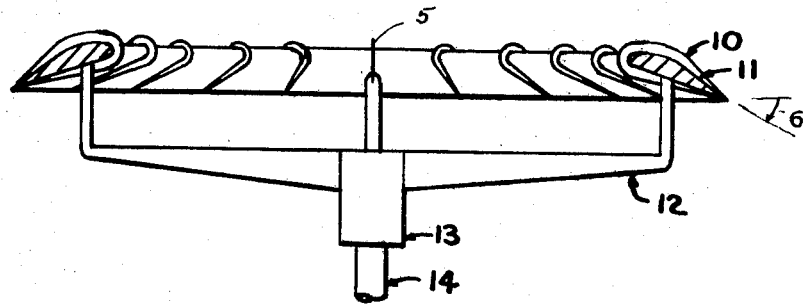
FIG. 1 is a side elevational view, partly in section, of a circular wing in accordance with one embodiment of this invention.
Figure 2:
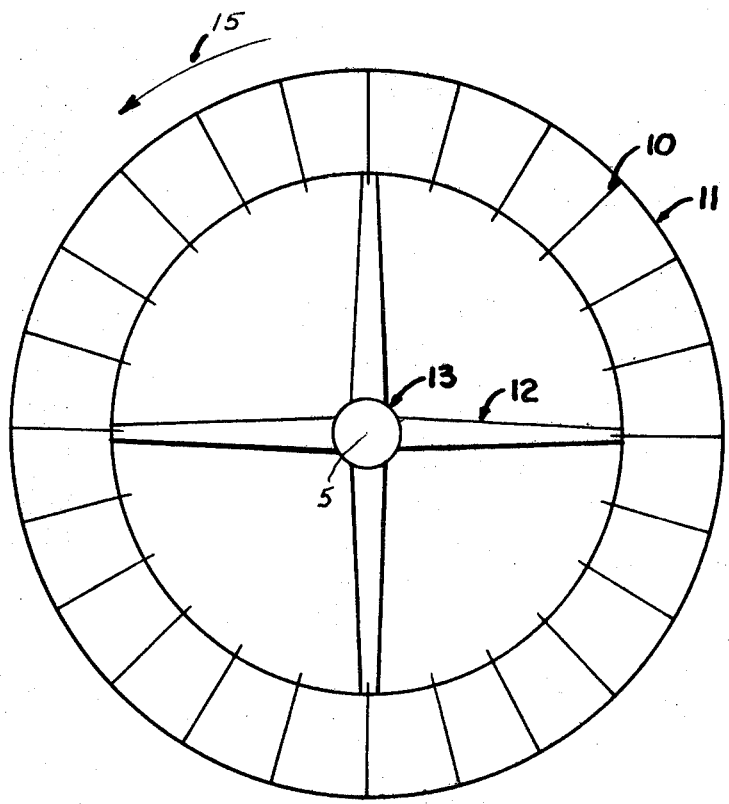
FIG. 2 is a top plan view of the embodiment of FIG. 1.

Referring to the FIGS. 1 and 2, an airfoil is made in circular shape. Vanes 10 are mounted on the airfoil to induce air to flow over the airfoil due to centrifugal force as the wing rotates. The airfoil shaped wing is caused to rotate around centerline 5 by using a motor or an engine. Specifically, the wing 11 is connected with hub 13 via spoke means 12. The hub 13 is connected with the shaft 14 which is connected with the engine (not shown). The arrow 15 indicates a typical direction of rotation. The angle of attack 6 for the airfoil will be varied depending of the speed of rotation of the circular wing.

Figure 3:
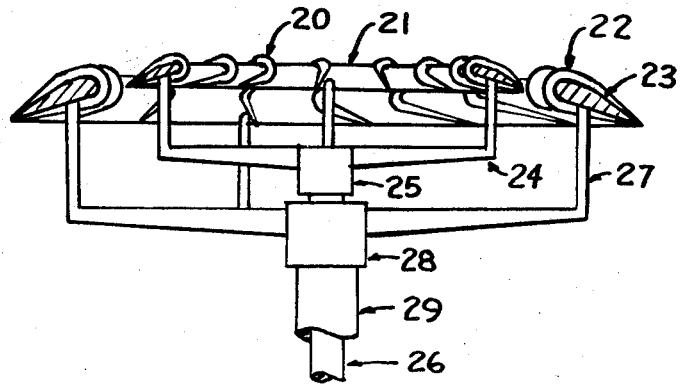
FIG. 3 is a side elevational view, partly in section, of two wings mounted concentrically with respect to each other in accordance with another embodiment of this invention.
Figure 4:
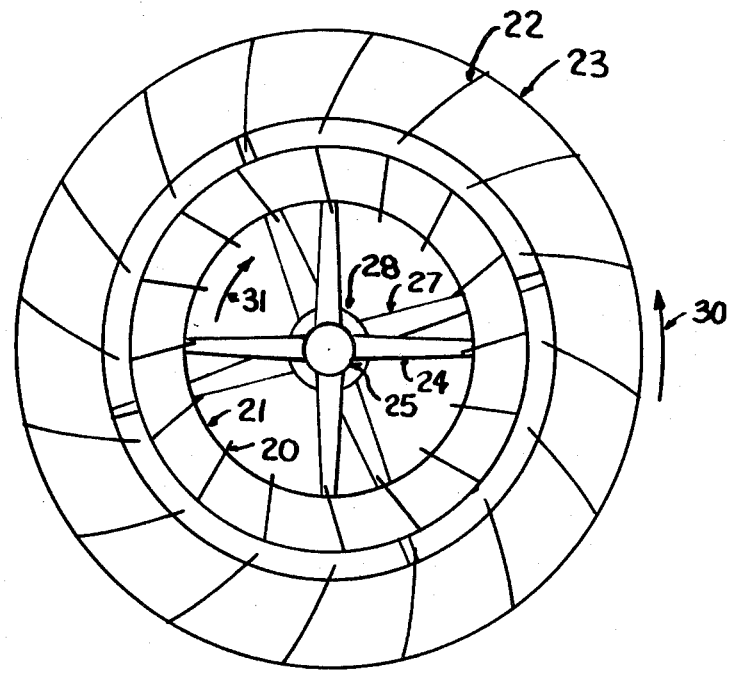
FIG. 4 is a top plan view of the wings of the embodiment of FIG. 3.

In a workable system for an aircraft, two or more circular airfoil wings are required, rotating in opposite directions, to counteract torsion produced when each one rotates. These wings may be placed one above another on same centerline, they may be placed one inside another on same centerline but on approximately same plane, they may be placed side-by-side on different centerlines or any combination of these. Further, they may be of the same or of different diameter. Specifically, FIGS. 3 and 4 illustrate dual, concentrically arranged, counter rotating circular wings 21 and 23. The smaller circular wing 21 has vanes 20 mounted thereon for effecting the radially outward flow of air. The larger wing 23 has vanes 22 disposed thereon for effecting continuous outward radial flow of the air. The smaller wing 21 is connected with its hub 25 via spoke means 24. The larger wing 23 is connected with its hub 28 via spoke means 27. The hub 25 is connected with shaft 26 which is connected with the engine (not shown). The hub 28 is connected with shaft 29 which is disposed about shaft 26 and rotating in the opposite direction through an appropriate and conventional gear box arrangement driven by the engine (not shown). The counter rotating feature is indicated by the arrows 31 and 30 showing the respective directions of rotation of the smaller wing 21 and the larger wing 23. With this arrangement, the air that passes over the smaller diameter wing 21 will also pass over the larger diameter wing 23, resulting in improved efficiency.

In operation, the wing 11 is rotated by an engine. The vanes 10 placed on the wing 11 cause the air to pass over the wing surface. The air passage will provide lift due to reduced pressure on the upper surface of the wing and impact, or ram, pressure under the wing, as in a conventional aircraft wing and as is well known in the aerodynamic art. Expressed otherwise, the circular wing rotating effects an outward flow of the air radially by centrifugal action of the vanes, much as a centrifugal pump operates, when the wing is rotated. The wing 11 is rotated similarly as with a helicopter propeller. The amount of lift that the airfoil, or wing, will provide depends on the speed of the air over the surface of the airfoil. In an airplane, speed is determined by the speed of the plane in the air, and during takeoff and landing, air speed is reduced. The rotary wing of this invention can be rotated at predetermined speeds to provide suitable air speeds over the airfoil and thereby provide the lift needed for heavy leads regardless of the forward speed of the aircraft. Moreover, by placing the two wings concentrically disposed with respect to each other, as illustrated in FIGS. 3 and 4, the air speed over the outer and larger wing will be much greater and therefore effect a greater lift. Also, power input to the wing system will be less for the two wings for a desired lift, since the air entering the outer and larger wing will have a higher initial velocity which has been imparted to it by the inner and smaller wing.

The height and spacing of the vanes on the wing depend upon the design speed of the wind and whether the wing is to operate alone or together with other wings as illustrated in FIGS. 3 and 4. The vanes may be placed radially as in FIG. 2 or curved backward with the interior edges leading the exterior edges in the direction of rotation, as illustrated in FIG. 4.

For horizontal movement through the air the shaft of the wing may be tilted or the entire aircraft tilted or rolled, as in conventional helicopter practice. The mechanisms for tiling the shaft, or tilting and rolling the aircraft with respect to the shaft, do not, per se, form a part of this invention and need not be described herein.

Although only the preferred embodiments of the device for carrying out the invention have been described above, it is not t be construed that my invention is limited to such embodiments. Other modifications may be made by Those skilled in the art without departing from the spirit and the scope of the invention defined.

Further, it will be clear that the embodiment of the invention which has been described may be changed in many ways, some of them have been indicated and such changes do not affect the essence of the invention as described in the annexed claims.

What is claimed as new is as follows:

1. In a vertical takeoff and landing type aircraft having a power means rotating a substantially vertically mounted shaft, having a lifting means connected with said shaft for effecting lift in response to rotation of said shaft; and having means for controlling pitch and roll of said aircraft with respect to said shaft; the improved lifting means comprising:
   a. an airfoil that is circular in shape and that is disposed concentrically about said shaft; said airfoil having a curved upper lifting surface to take advantage of the Bernoulli effect of conventional airfoils and having a substantially flat bottom surface that is tilted to effect lift from ram air pressure, and having a predetermined angle of attack; said airfoil having its lifting surfaces disposed substantially perpendicular to radials from said shaft so as to effect lift in response to flow of air radially outwardly from said shaft;
   b. spoke means connecting said airfoil with said shaft; and
   c. vanes disposed on said airfoil so as to effect flow of air centrifugally radially outwardly over said airfoil for effecting via speed of rotation of said airfoil any degree of lift regardless of the speed of said aircraft.

2. The aircraft of claim 1 wherein said improved lifting means comprises a plurality of said air foils, each with its said spoke means and its said vane means.

3. The aircraft of claim 2 wherein said plurality of airfoils comprise a large said airfoil disposed concentrically about a smaller said airfoil; said airfoils are connected with said power means so as to rotate in opposite directions; and the respective sets of vane means are adapted to effect series of flow of air over the counter rotating smaller airfoil and large airfoil.

4. The aircraft of claim 3 wherein said vanes in each said set of vanes are disposed with their interior edges leading their exterior edges in the direction of rotation.

5. The aircraft of claim 1 wherein said vanes are substantially parallel with respective radials.

6. The aircraft of claim 1 wherein said vanes are disposed with their interior edges leading their exterior edges in the direction of rotation.